(12) United States Patent
Fukushima (10) Patent No.: US 12,420,558 B2
(45) Date of Patent: Sep. 23, 2025

(54) PRINTING APPARATUS

(71) Applicant: SEIKO EPSON CORPORATION, Tokyo (JP)

(72) Inventor: Shigeki Fukushima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 197 days.

(21) Appl. No.: 18/474,148

(22) Filed: Sep. 25, 2023

(65) Prior Publication Data

US 2024/0104325 A1    Mar. 28, 2024

(30) Foreign Application Priority Data

Sep. 26, 2022    (JP) .................................. 2022-152240

(51) Int. Cl.
*B41J 2/175*    (2006.01)

(52) U.S. Cl.
CPC ........... *B41J 2/17566* (2013.01); *B41J 2/175* (2013.01); *B41J 2002/17569* (2013.01); *B41J 2002/17589* (2013.01)

(58) Field of Classification Search
CPC .................... B41J 2/17566; B41J 2/175; B41J 2002/17569; B41J 2002/17589; B41J 2002/17573; B41J 2/17509; B41J 29/38; G06K 15/4075

See application file for complete search history.

(56) References Cited

U.S. PATENT DOCUMENTS

2023/0241896 A1*    8/2023    Suda .................... B41J 2/17566
                                                                           347/7

FOREIGN PATENT DOCUMENTS

JP          2014-058098 A    4/2014

* cited by examiner

*Primary Examiner* — Justin Seo
(74) *Attorney, Agent, or Firm* — WORKMAN NYDEGGER (57) ABSTRACT

A printing apparatus includes a control unit, wherein the control unit executes processing of updating a ink remaining amount information to an initial remaining amount and processing of updating a ink usage amount information to an initial usage amount when an input indicating that a ink storage unit is refilled with a ink is received, displays, on a display unit, a first ink indication indicating a usage state of the ink based on the ink remaining amount information and a second ink indication indicating the usage state of the ink based on the ink usage amount information, and switches an indication on the display unit from the first ink indication to the second ink indication or from the second ink indication to the first ink indication when an input instructing switching of the indication on the display unit is received.

8 Claims, 8 Drawing Sheets

PRINTING APPARATUS

The present application is based on, and claims priority from JP Application Serial Number 2022-152240, filed Sep. 26, 2022, the disclosure of which is hereby incorporated by reference herein in its entirety.

BACKGROUND

1. Technical Field

The present disclosure relates to a printing apparatus.

2. Related Art

In the related art, a known printing apparatus includes an ink container that can be refilled with ink (see, for example, JP-A-2014-058098). A printing apparatus disclosed in JP-A-2014-058098 includes an ink tank that can be refilled with ink and displays, on a display unit, the remaining amount of ink contained in the ink tank.

To display the remaining amount of ink, it is necessary to update the remaining amount in response to refilling of the ink container with ink. For example, the apparatus disclosed in JP-A-2014-058098 estimates that the remaining amount of ink is a full amount in response to an input from a user. However, when the user does not fully refill the ink container with ink, there is a difference between the estimated amount of ink and the amount of ink actually contained in the ink container. Thus, the display of the remaining amount of ink is less likely to be utilized. Thus, it has been desired to facilitate utilization of display related to the amount of ink.

SUMMARY

According to an aspect of the present disclosure, a printing apparatus includes an ink storage unit configured to be refilled with ink, a printing head configured to eject the ink supplied from the ink storage unit to a printing medium, a display unit, and a control unit configured to manage ink remaining amount information indicating an amount of the ink stored in the ink storage unit and ink usage amount information indicating a cumulative value of an amount of the ink ejected from the printing head, wherein the control unit executes at least one of processing of updating the ink remaining amount information to an initial remaining amount or processing of updating the ink usage amount information to an initial usage amount when an input indicating that the ink storage unit is refilled with the ink is received, displays, on the display unit, a first ink indication indicating a usage state of the ink based on the ink remaining amount information and a second ink indication indicating the usage state of the ink based on the ink usage amount information, and switches an indication on the display unit from the first ink indication to the second ink indication or from the second ink indication to the first ink indication when an input instructing switching of the indication on the display unit is received.

DESCRIPTION OF EMBODIMENTS

1. Configuration of Printing Apparatus

An embodiment of the present disclosure will be described below with reference to the accompanying drawings.

Figure 1:
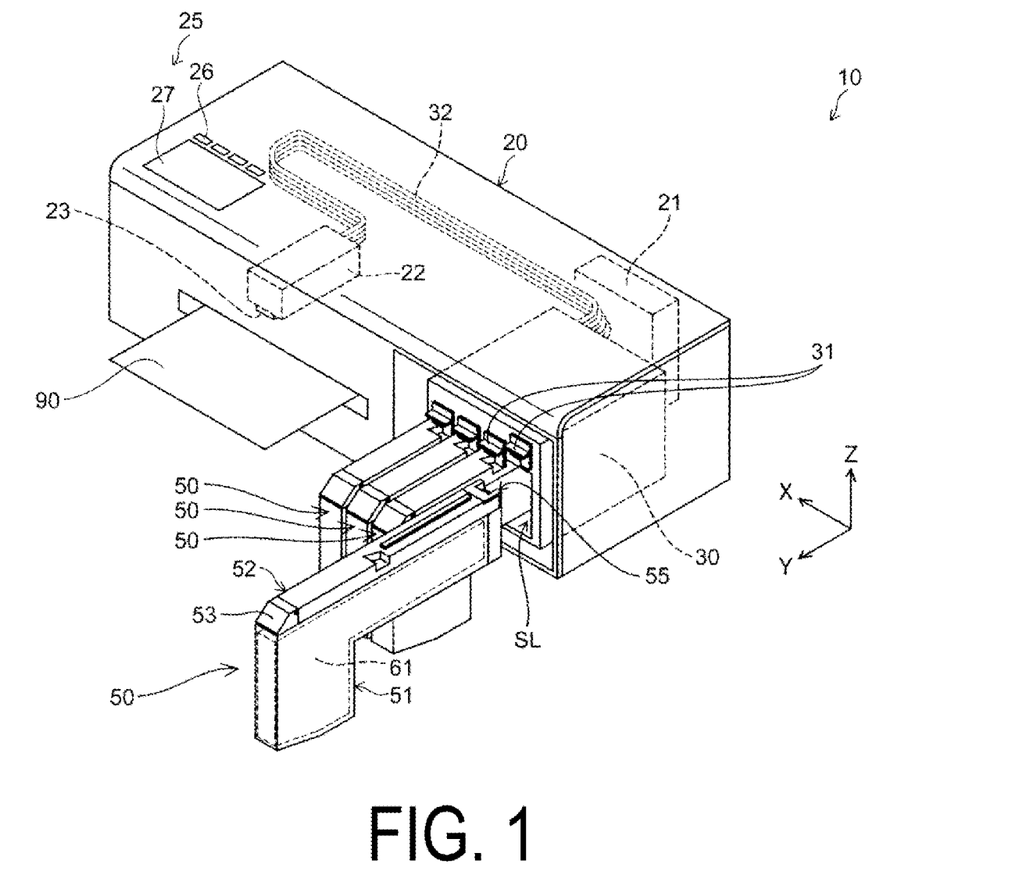
FIG. 1 is a perspective view illustrating a configuration of a printing system according to an embodiment.
Figure 2:
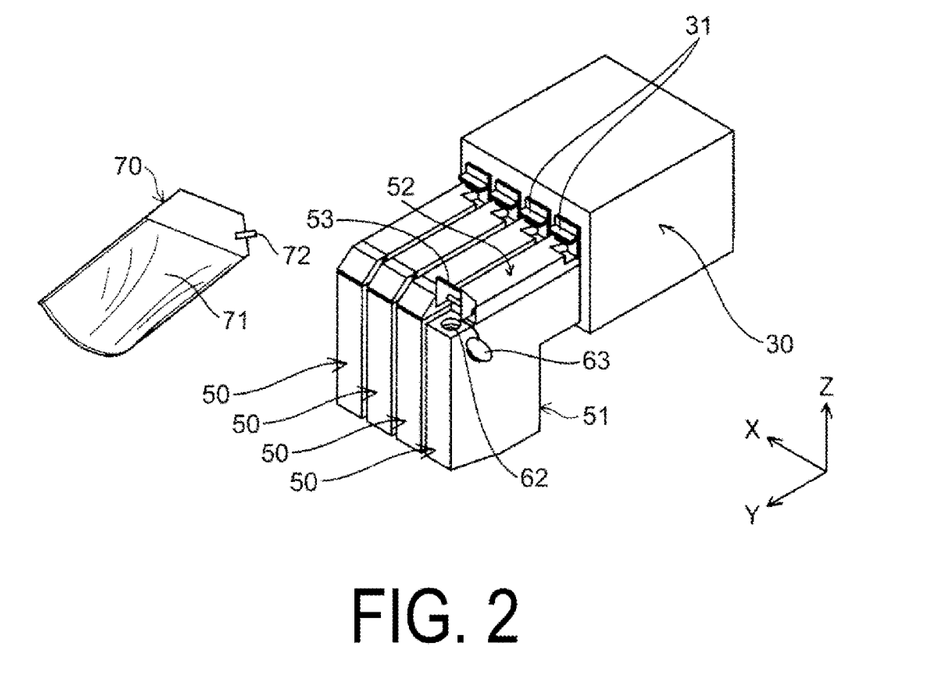
FIG. 2 is an explanatory diagram of an operation of refilling an ink tank with ink.

FIG. 1 is a perspective view illustrating a configuration of a printing apparatus 10. FIG. 1 and FIG. 2 described below illustrate XYZ-axes orthogonal to each other to specify directions.

As illustrated in FIG. 1, the printing apparatus 10 includes a printing apparatus main body 20 and ink tanks 50. The printing apparatus main body 20 is provided with a holder 30. In a state where each ink tank 50 is mounted at the holder 30, the printing apparatus 10 supplies ink from the ink tank 50 to the printing apparatus main body 20. The printing apparatus main body 20 performs printing using the ink supplied from the ink tank 50. The ink tank 50 corresponds to an example of an ink storage unit.

The number of the ink tanks 50 mounted at the holder 30 is not limited, and in the embodiment, an example will be described in which four ink tanks 50 can be mounted at the holder 30. These four ink tanks 50 store respective colors of ink such as black (K) ink, cyan (C) ink, magenta (M) ink, and yellow (Y) ink.

The holder 30 is a holding device holding the ink tanks 50. Slots SL are formed in the holder 30, the slots SL being regions into which the respective ink tanks 50 are inserted. One ink tank 50 can be inserted into one slot SL. In the holder 30, one slot SL is provided with one engaging portion 31. The engaging portion 31 of the holder 30 is configured to be engageable with the ink tank 50 inserted into the slot SL and prevents the ink tank 50 from being accidentally detached from the slot SL.

The printing apparatus main body 20 is a printing apparatus performing printing on a printing medium 90. In the embodiment, the printing apparatus main body 20 is an inkjet printer forming an image on the printing medium 90 by ejecting ink to the printing medium 90. In addition to the holder 30, the printing apparatus main body 20 includes a control unit 21, a carriage 22, a printing head 23, and an operation panel 25.

The type and shape of the printing medium 90 on which printing is performed by the printing apparatus 10 are not particularly limited. The printing medium 90 is, for example, a sheet made of paper or synthetic resin and is a cut sheet cut into a standardized size or a continuous sheet. The continuous sheet is, for example, roll paper wound in a roll shape or fanfold paper folded into a predetermined size. In the embodiment, a case in which the printing medium 90 is a cut sheet as illustrated in FIG. 1 will be described as an example.

In the printing apparatus main body 20, the holder 30 is provided at a portion different from that of the carriage 22, and ink is supplied from the holder 30 at which the ink tanks 50 are mounted to the printing head 23 provided at the carriage 22 through a flexible tube 32. In this manner, the mechanism of the printing apparatus main body 20 in which the holder 30 is provided at a portion different from that of the carriage 22 is also referred to as an off-carriage type printer.

The printing head 23 is mounted at the carriage 22. The carriage 22 is movable relative to the printing medium 90, and the printing head 23 moves relative to the printing medium 90 with movement of the carriage 22.

An ink supply mechanism supplying ink from the ink tanks 50 mounted at the holder 30 is coupled to the printing head 23. As an example of the ink supply mechanism, the flexible tube 32 having flexibility is used in the embodiment. The printing head 23 ejects the ink supplied from the ink tanks 50 through the flexible tube 32 to the printing medium 90.

In the embodiment, the control unit 21 and the carriage 22 are electrically coupled to each other through a flexible cable (not illustrated), and the printing head 23 ejects the ink based on a control signal from the control unit 21.

The operation panel 25 includes an operation unit 26 configured of an operation button for receiving an operation from the user and a display unit 27 configured of a display such as a liquid crystal display or an organic EL display. The control unit 21 will be described below.

2. Configuration of Ink Storage Unit

Each ink tank 50 is configured to store ink and is a refillable ink storage unit that can be refilled with ink to be stored in the ink tank 50. The ink tank 50 is configured detachably from the holder 30. FIG. 1 illustrates a state in which one of the four ink tanks 50 located in the −X direction is detached from the holder 30.

In the embodiment, the user of the printing apparatus 10 can mount the ink tank 50 at the holder 30 by moving the ink tank 50 in the −Y direction with respect to the slot SL of the holder 30. The user can detach the ink tank 50 from the holder 30 by moving the ink tank 50 in the +Y direction in a state where the ink tank 50 is disengaged from the engaging portion 31.

The ink tank 50 includes a housing 51 and a slider 52. As illustrated in FIG. 1, the housing 51 of the ink tank 50 is a box-shaped body including an ink accommodation portion 61 therein. The ink accommodation portion 61 is a container capable of storing a liquid and is configured of, for example, a flexible bag or hard synthetic resin.

The slider 52 is a member detachably mounted at the housing 51 and can be referred to as a sliding member. By sliding the slider 52 relative to the housing 51 in the +Y direction, the slider 52 can be detached from the housing 51. The slider 52 is provided with a lid portion 53. In a state where the slider 52 is mounted at the housing 51, the lid portion 53 covers an ink injection port 62.

FIG. 2 is an explanatory diagram of an operation of refilling the ink tank 50 with ink and is a perspective view illustrating a state in which the ink tank 50 mounted at the holder 30 is refilled with ink.

As illustrated in FIG. 2, the housing 51 is provided with ink injection port 62 and a lid 63, in addition to the ink accommodation portion 61.

The ink injection port 62 is an opening communicating with the ink accommodation portion 61, and ink can be injected into the ink accommodation portion 61 through the ink injection port 62. The lid 63 is an openable/closable lid attached to the ink injection port 62 and seals the ink injection port 62. The housing 51 is also provided with an atmosphere opening port (not illustrated). The atmosphere opening port communicates with the ink accommodation portion 61, and opening the ink accommodation portion 61 to the atmosphere allows smooth ink injection.

When the ink tank 50 is refilled with ink, the user opens the lid portion 53 of the slider 52 and detaches the lid 63 from the ink injection port 62 of the housing 51 as illustrated in FIG. 2. Then, the user prepares an ink container 70 accommodating ink for refilling and injects the ink from an ejection port 72 of the ink container 70 to the ink injection port 62. Thereafter, the user seals the ink injection port 62 with the lid 63 and closes the lid portion 53. Thus, the ink refilling is completed.

3. Control System of Printing Apparatus

Figure 3:
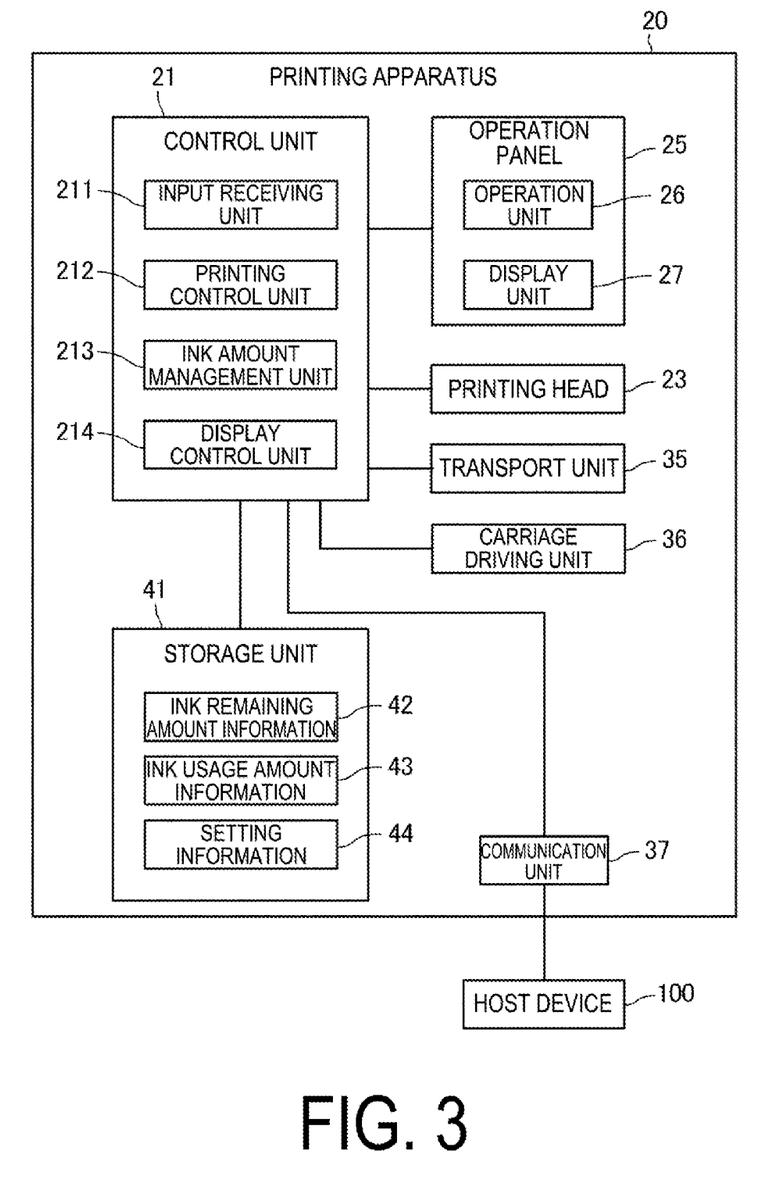
FIG. 3 is a functional block diagram of a printing apparatus.

FIG. 3 is a block diagram of the printing apparatus 10 and illustrates a functional configuration of a control system of the printing apparatus 10.

The printing apparatus 10 includes the control unit 21. The control unit 21 includes a processor (not illustrated) configured of a central processing unit (CPU), a micro processing unit (MPU), or the like. The control unit 21 executes a predetermined control program, thereby controlling each unit of the printing apparatus 10 in cooperation of software and hardware. The control unit 21 may include a memory (not illustrated) coupled to the processor. This memory is a volatile memory and is, for example, a random access memory (RAM). In this case, the control unit 21 temporarily stores, in the memory, the program to be executed by the processor and data to be processed by the processor. The control unit 21 may include a non-volatile storage unit (not illustrated). The non-volatile storage unit is configured of a read only memory (ROM), a hard disk, a solid state drive (SSD), a flash memory, or the like, and stores the control program to be executed by the processor of the control unit 21.

The control unit 21 includes an input receiving unit 211, a print control unit 212, an ink amount management unit 213, and a display control unit 214. These are functional units implemented by the processor of the control unit 21 executing the program.

A storage unit 41 is coupled to the control unit 21. The storage unit 41 is a storage device configured of a hard disk or an SSD. The storage unit 41 stores data and the like to be processed by the processor of the control unit 21. FIG. 3 illustrates ink remaining amount information 42, ink usage amount information 43, and setting information 44 as the data stored in the storage unit 41.

The printing head 23, the operation unit 26 and the display unit 27 included in the operation panel 25, a transport unit 35, a carriage driving unit 36, and a communication unit 37 are coupled to the control unit 21. The configuration illustrated in FIG. 3 is a main part of the printing apparatus 10 controlled by the control unit 21, and a control target of the control unit 21 is not limited to the configuration illustrated in FIG. 3.

The transport unit 35 is a driving unit transporting the printing medium 90 in the printing apparatus 10. The transport unit 35 includes, for example, a transport motor (not illustrated) controlled by the control unit 21 and a transport roller (not illustrated) driven by the transport motor. The transport unit 35 may include a sensor detecting the presence or absence of the printing medium 90 and the position of an end of the printing medium 90 in the transport path of the printing medium 90.

The carriage driving unit 36 is a driving unit moving the carriage 22. The carriage driving unit 36 includes, for example, a carriage driving motor (not illustrated) controlled by the control unit 21, and a driving belt or a gear (not illustrated) moving the carriage 22 by power of the carriage driving motor. The carriage driving unit 36 may include a guide shaft guiding movement of the carriage 22, and a linear encoder or a position sensor detecting the position of the carriage 22.

The communication unit 37 is a communication device performing wired communication using a cable or wireless communication using a wireless communication line. The communication unit 37 is connected to a host device 100, which is a device outside the printing apparatus 10. The host device 100 is a computer such as a desktop computer, a laptop computer or a tablet computer. The host device 100 may be a portable information processing device such as a smart phone. The communication unit 37 performs communication under control by the control unit 21. The communication unit 37 receives, from the host device 100, print data including data of an image and a character to be printed by the printing apparatus 10 and a command for a print instruction. The communication unit 37 outputs the received data to the control unit 21.

The printing head 23 is driven under control of the control unit 21 and ejects ink.

The operation unit 26 outputs an operation signal indicating an operation content to the control unit 21 in accordance with a user operation. The display unit 27 displays a character and an image under control of the control unit 21.

The input receiving unit 211 included in the control unit 21 receives an input from the operation unit 26 based on the operation signal input from the operation unit 26. The input receiving unit 211 analyzes and acquires the input content.

The print control unit 212 performs printing on the printing medium 90 by operating the printing head 23, the transport unit 35, and the carriage driving unit 36 based on the print data received by the communication unit 37.

The print control unit 212 controls a maintenance operation of the printing head 23. The maintenance operation includes, for example, flushing and cleaning. The flushing is an operation of ejecting ink from the printing head 23 in order to adjust the state of the ink at the nozzle surface of the printing head 23. The print control unit 212 operates the carriage driving unit 36 to move the printing head 23 to a home position (not illustrated) and performs the flushing every predetermined time or every time a predetermined amount of printing is performed. The cleaning is an operation of ejecting ink from the printing head 23 in order to improve flow of the ink through the nozzle of the printing head 23 and the flexible tube 32. The print control unit 212 operates the carriage driving unit 36 to move the printing head 23 to the home position (not illustrated) and perform the cleaning every predetermined time or every time a predetermined amount of printing is performed. The control unit 21 may perform the flushing and the cleaning during the printing or may perform the flushing and the cleaning when the printing is not performed.

The ink amount management unit 213 manages the amount of ink in the printing apparatus main body 20. Specifically, the ink amount management unit 213 counts the amount of ink ejected by the printing head 23. The ink amount management unit 213 counts the amount of ink used in printing, flushing, and cleaning of the printing apparatus main body 20. The amount of ink counted by the ink amount management unit 213 corresponds to an example of ink consumption information.

For example, when the printing apparatus main body 20 performs printing, the ink amount management unit 213 calculates, based on the print data, the size of ink droplets and the number of shots ejected by the printing head 23 at the time of the printing and calculates the amount of ink by multiplying the obtained size of ink droplets and the number of shots. In addition, for example, the ink amount management unit 213 calculates the amount of ink that the print control unit 212 causes the printing head 23 to eject at the time of flushing based on setting data related to the flushing. In addition, for example, the ink amount management unit 213 calculates the amount of ink that the print control unit 212 causes the printing head 23 to eject at the time of cleaning based on setting data related to the cleaning. The setting data is included in the setting information 44, for example.

The ink amount management unit 213 manages the amount of ink for each type of ink or for each color of ink used in the printing apparatus main body 20. Specifically, the ink amount management unit 213 manages the amount of ink for each ink tank 50 mounted at the holder 30.

All of the operations and processing related to the amount of ink described in the embodiment can be executed for each ink tank 50 mounted at the holder 30 or for each color of ink used by the printing apparatus 10.

The ink remaining amount information 42 stored in the storage unit 41 is information indicating the amount of ink stored in the ink tank 50. The ink remaining amount information 42 indicates the amount of ink for each ink tank 50 mounted at the holder 30. The ink remaining amount information 42 may be, for example, a value obtained by actually detecting the amount of ink in the ink tank 50. However, in the embodiment, the ink remaining amount information 42 indicates the amount of ink in the ink tank 50 estimated by the ink amount management unit 213.

The ink usage amount information 43 stored in the storage unit 41 is information indicating the cumulative amount of ink ejected by the printing head 23. The ink usage amount information 43 includes information indicating the amount of ink ejected by the printing head 23 for each ink tank 50 mounted at the holder 30. The ink usage amount information 43 can be obtained by accumulating or adding up the amount of ink counted by the ink amount management unit 213.

When the printing head 23 performs an operation of ejecting ink, the ink amount management unit 213 counts the amount of ink ejected by the printing head 23 as described above. When the amount of ink is newly counted, the ink amount management unit 213 calculates and updates the ink remaining amount information 42 and the ink usage amount information 43 based on the counted amount.

When the ink tank 50 is refilled with ink, the user operates the operation unit 26 to provide an input indicating that the ink tank 50 has been refilled with ink. The input receiving unit 211 receives this input. This input may be also performed by the user operating the host device 100. In this case, the input receiving unit 211 receives a command received by the communication unit 37 from the host device 100 as the input indicating that the ink tank 50 has been refilled with ink. This input can be performed for each ink tank 50. That is, the user can refill each ink tank 50 with ink.

In response to the input indicating that the ink tank 50 has been refilled with ink, the ink amount management unit 213 updates the ink remaining amount information 42 and the ink usage amount information 43. This updating processing can be referred to as resetting.

In detail, the ink amount management unit 213 updates the ink remaining amount information 42 to an initial remaining amount, which is an initial value, in response to the input indicating that the ink tank 50 has been refilled with ink. The initial remaining amount is, for example, the amount of ink in a state in which the contained in the ink tank 50 reaches the capacity of the ink tank 50, in other words, the full capacity of the ink tank 50. The initial remaining amount is included in, for example, the setting information 44.

In addition, the ink amount management unit 213 updates the ink usage amount information 43 to an initial usage amount, which is an initial value, in response to the input indicating that the ink tank 50 has been refilled with ink. The initial usage amount is, for example, a value indicating that the usage amount of ink is 0 (zero). The initial usage amount is included in, for example, the setting information 44.

The printing apparatus 10 of the embodiment is configured such that the user can select a refilling amount when the user refills the ink tank 50 with ink. When providing the input indicating that the ink tank 50 has been refilled with ink, the user can select the refilling amount of ink. For example, the user can select the amount of ink stored in the refilled ink tank 50 from four levels of the full capacity, 75%, 50%, and 25%. When receiving the input indicating that the ink tank 50 has been refilled with ink, the input receiving unit 211 receives an input of the amount of ink in the refilled ink tank 50 designated by the user. In this case, the ink amount management unit 213 updates the ink remaining amount information 42 based on the amount of ink in the refilled ink tank 50 designated by the user. Specifically, the ink amount management unit 213 determines the initial remaining amount based on the amount of ink in the refilled ink tank 50 designated by the user and updates the ink remaining amount information 42 based on the determined initial remaining amount. Accordingly, even when the user does not fully refill the ink tank 50 with ink, the amount of ink with which the user refills the ink tank 50 can be reflected in the ink remaining amount information 42. The user can refill the ink tank 50 with, for example, a small amount of ink without fully refilling the ink tank 50 with ink.

The ink amount management unit 213 can perform notification based on the ink remaining amount information 42 and/or the ink usage amount information 43. For example, when the amount of ink indicated by the ink remaining amount information 42 reaches a preset remaining amount threshold value, the ink amount management unit 213 performs notification. In addition, for example, when the amount of ink indicated by the ink usage amount information 43 reaches a preset usage amount threshold value, the ink amount management unit 213 performs notification. As a result, it is possible to prompt the user to refill the ink tank 50 with ink or to pay attention to the remaining amount of ink stored in the ink tank 50.

The mode of the notification performed by the ink amount management unit 213 is optional, and examples thereof include a mode of displaying a message on the display unit 27 and a mode of turning on or blinking an LED indicator included in the printing apparatus 10. The ink amount management unit 213 may transmit a command for performing notification to the host device 100 and cause the host device 100 to perform notification. In this case, the host device 100 performs notification such as display on a display screen included in the host device 100, output of a sound, and a vibration.

The ink amount management unit 213 updates the ink remaining amount information 42 at a predetermined timing in response to ejection of ink by the printing head 23. In this case, the ink amount management unit 213 updates the ink remaining amount information 42 by subtracting the amount of ink ejected by the printing head 23 from the ink remaining amount information 42. Thus, the ink remaining amount information 42 indicates the amount of ink in the ink tank 50 estimated from the initial remaining amount updated when the ink tank 50 is refilled with ink and the amount of ink ejected by the printing head 23. Thus, as described above, by determining the initial remaining amount based on the amount of ink in the refilled ink tank 50 designated by the user and updating the ink remaining amount information 42 to the determined initial remaining amount, it is possible to set the ink remaining amount information 42 to information more accurately reflecting the amount of ink in the ink tank 50. That is, it is possible to increase the accuracy of estimation of the amount of ink in the ink tank 50. Thus, it is also possible to increase the accuracy of notification based on the ink remaining amount information 42.

In addition, the ink amount management unit 213 performs notification when the ink usage amount information 43 reaches the usage amount threshold value, and the usage amount threshold value may reflect the amount of ink in the ink tank 50 when the ink usage amount information 43 is reset. For this reason, the ink amount management unit 213 updates the usage amount threshold value based on the amount of ink in the refilled ink tank 50 designated by the user. Specifically, the ink amount management unit 213 determines the usage amount threshold value based on the amount of ink in the refilled ink tank 50 designated by the user and stores the setting information 44 including the determined usage amount threshold value in the storage unit 41. As a result, even when the user does not fully refill the ink tank 50 with ink, it is possible to perform notification at an appropriate timing.

The display control unit 214 controls the display unit 27 to display a character, an image, and other display objects on the display unit 27. For example, the display control unit 214 displays an ink indication on the display unit 27 based on the ink remaining amount information 42 and/or the ink usage amount information 43. The ink indication is an indication presented to the user as a guide of the amount of ink that can be used in the printing apparatus 10.

Figure 4:
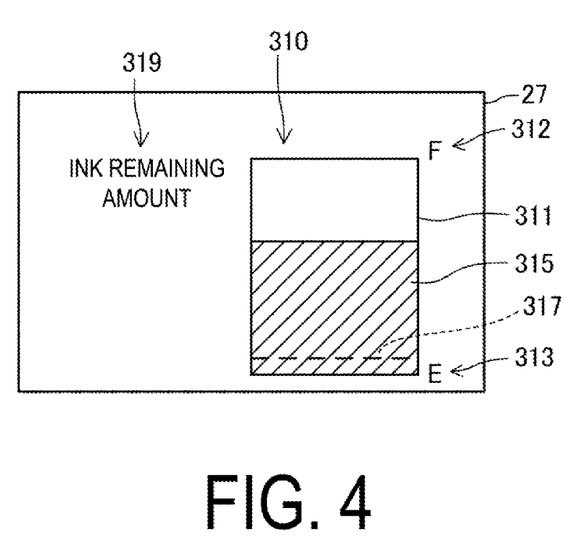
FIG. 4 is a diagram illustrating an indication example on a display unit.

FIG. 4 is a diagram illustrating an indication example on the display unit 27 and illustrates a first ink indication 310. The first ink indication 310 is one mode of the ink indication and is intended to indicate the amount of ink stored in the ink tank 50 based on the ink remaining amount information 42.

The first ink indication 310 includes an indication frame 311 and an explanatory indication 319. The explanatory indication 319 is an indication for describing that the first ink indication 310 indicates the amount of ink stored in the ink tank 50.

A guide 312 indicating the full capacity is disposed at an upper end of the indication frame 311, and a guide 313 indicating that the remaining amount is zero is disposed near a lower end of the indication frame 311. A remaining amount indicator 315 is disposed in the indication frame 311. The size of the remaining amount indicator 315 in the vertical direction indicates the amount of ink indicated by the ink remaining amount information 42. When the amount of ink in the ink tank 50 is full, the remaining amount indicator 315 having a size reaching the upper end of the indication frame 311 is displayed. When the amount of ink is zero, the remaining amount indicator 315 is not displayed or the remaining amount indicator 315 having a minimum size is displayed. A guide 317 indicating the amount of ink corresponding to the remaining amount threshold value is disposed in the indication frame 311. For example, notification is performed at a timing when the remaining amount indicator 315 decreases and approaches the guide 317.

Figure 5:
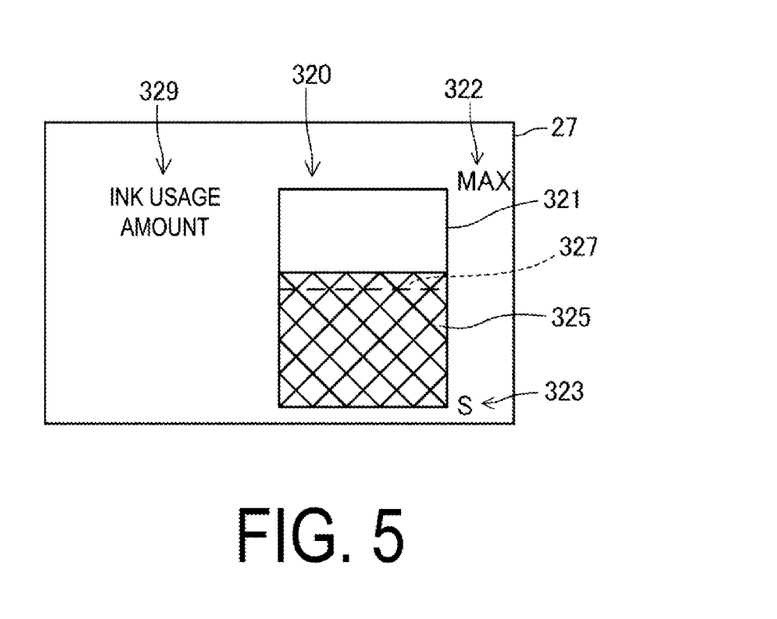
FIG. 5 is a diagram illustrating an indication example on the display unit.

FIG. 5 is a diagram illustrating an indication example on the display unit 27 and illustrates a second ink indication 320. The second ink indication 320 is one mode of the ink indication and is intended to indicate the amount of ink ejected by the printing head 23 based on the ink usage amount information 43.

The second ink indication 320 includes an indication frame 321 and an explanatory indication 329. The explanatory indication 329 is an indication for describing that the second ink indication 320 is the amount of used ink.

A guide 322 indicating that the usage amount of ink is the upper limit is disposed at an upper end of the indication frame 321, and a guide 323 indicating start of ink use is disposed near a lower end of the indication frame 321. A usage amount indicator 325 is disposed in the indication frame 321. The size of the usage amount indicator 325 in the vertical direction indicates the amount of ink indicated by the ink usage amount information 43. When the ink usage amount information 43 is the initial usage amount, the usage amount indicator 325 having a minimum size is displayed at the lower end of the indication frame 321 or the usage amount indicator 325 is not displayed. A guide 327 indicating the ink amount corresponding to the usage amount threshold value is disposed in the indication frame 321. For example, notification is performed at a timing when the usage amount indicator 325 increases and approaches the guide 327.

The display control unit 214 can switch the ink indication between the first ink indication 310 and the second ink indication 320 and display the ink indication on the display unit 27. The display control unit 214 displays, on the display unit 27, one of the first ink indication 310 and the second ink indication 320 that is preset as a default ink indication. In addition, the display control unit 214 switches the ink indication between the first ink indication 310 and the second ink indication 320 when the input receiving unit 211 receives an input instructing switching of the ink indication during operation of the printing apparatus 10.

The ink amount management unit 213 may perform notification when the amount of ink indicated by the ink remaining amount information 42 becomes such a value that the remaining amount indicator 315 exceeds the upper limit during display of the first ink indication 310. In this case, the display control unit 214 may maintain the display of the first ink indication 310 in a state in which the remaining amount indicator 315 is maximized. Similarly, the ink amount management unit 213 may perform notification when the amount of ink indicated by the ink usage amount information 43 becomes such a value that the usage amount indicator 325 exceeds the upper limit during display of the second ink indication 320. In this case, the display control unit 214 may maintain the display of the second ink indication 320 in a state in which the usage amount indicator 325 is maximized.

4. Operation of Printing Apparatus

Figure 6:
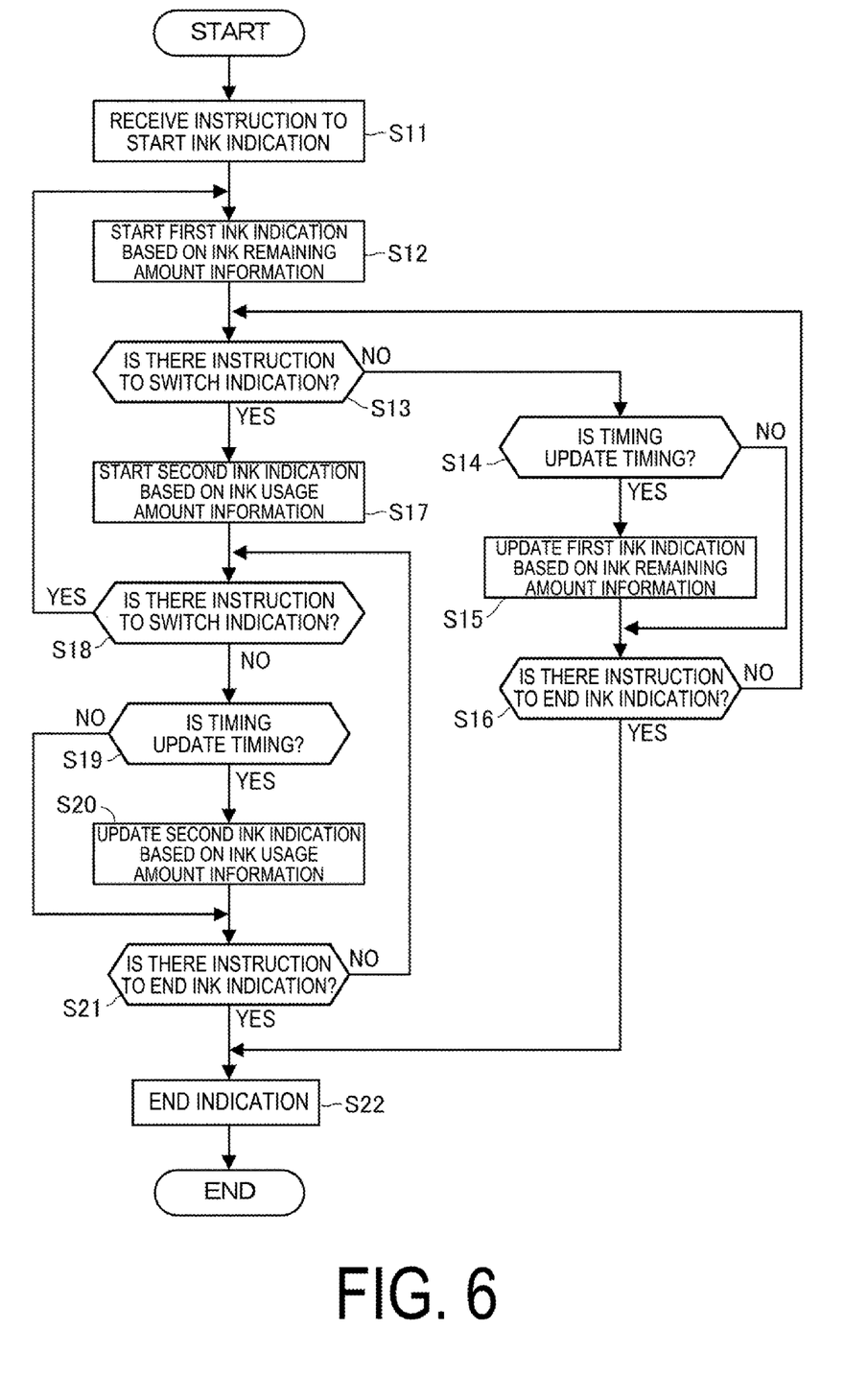
FIG. 6 is a flowchart illustrating an operation of the printing apparatus.

FIG. 6 is a flowchart illustrating an operation of the printing apparatus 10 and illustrates an operation of the control unit 21 related to the ink indication. For example, step S11 in FIG. 6 is executed by the input receiving unit 211, and steps S12, S14, S15, S17, S19 to S20, and S22 are executed by the display control unit 214. For example, steps S13, S16, S18, and S21 are executed by the input receiving unit 211 and the display control unit 214.

In step S11, the control unit 21 receives an instruction to start the ink indication from the user. The control unit 21 proceeds to step S12 and starts displaying the first ink indication 310 based on the ink remaining amount information 42.

Subsequently, in step S13, the control unit 21 determines whether an instruction to switch the ink indication has been input by the user. When the instruction to switch the ink indication has not been input (No in step S13), the control unit 21 proceeds to step S14. In step S14, the control unit 21 determines whether a timing is an update timing of the first ink indication 310. The update timing is, for example, a timing after elapse of a predetermined update cycle from display start or update of the first ink indication 310. The update cycle is preset, included in the setting information 44, and stored in the storage unit 41.

When it is determined that the timing is the update timing of the first ink indication 310 (YES in step S14), the control unit 21 proceeds to step S15. In step S15, the control unit 21 refers to the ink remaining amount information 42 again, updates the remaining amount indicator 315 of the first ink indication 310 based on the ink remaining amount information 42, and proceeds to step S16.

When it is determined that the timing is not the update timing of the first ink indication 310 (No in step S14), the control unit 21 skips step S15 and proceeds to step S16.

In step S16, the control unit 21 determines whether an instruction to end the ink indication has been input by the user. When it is determined that the instruction to end the ink indication has been input (YES in step S16), the control unit 21 proceeds to step S22. In step S22, the control unit 21 ends the display of the first ink indication 310 or the second ink indication 320 on the display unit 27 and ends the present processing.

In step S16, when it is determined that the instruction to end the ink indication has not been input by the user (No in step S16), the control unit 21 returns to step S13.

In step S13, when it is determined that the instruction to switch the ink indication has been input (YES in step S13), the control unit 21 proceeds to step S17. In step S17, the control unit 21 starts displaying the second ink indication 320 based on the ink usage amount information 43 and proceeds to step S18. Here, the control unit 21 ends the display of the first ink indication 310 as the second ink indication 320 starts to be displayed.

In step S18, the control unit 21 determines whether an instruction to switch the ink indication has been input by the user. When the instruction to switch the ink indication has been input (YES in step S18), the control unit 21 returns to step S12 and starts displaying the first ink indication 310. Here, the control unit 21 ends the display of the second ink indication 320 as the first ink indication 310 starts to be displayed.

In step S18, when the instruction to switch the ink indication has not been input (No in step S18), the control unit 21 proceeds to step S19. In step S19, the control unit 21 determines whether a timing is an update timing of the second ink indication 320. The update timing is, for example, a timing after elapse of a predetermined update cycle from display start or update of the second ink indication 320. The update cycle is preset, included in the setting information 44, and stored in the storage unit 41.

When it is determined that the timing is the update timing of the second ink indication 320 (YES in step S19), the control unit 21 proceeds to step S20. In step S20, the control unit 21 refers to the ink usage amount information 43 again, updates the usage amount indicator 325 of the second ink indication 320 based on the ink usage amount information 43, and proceeds to step S21. When it is determined that the timing is not the update timing of the second ink indication 320 (No in step S19), the control unit 21 skips step S20 and proceeds to step S21.

In step S21, the control unit 21 determines whether an instruction to end the ink indication has been input by the user. When it is determined that the instruction to end the ink indication has been input (YES in step S21), the control unit 21 proceeds to step S22. When it is determined that the instruction to end the ink indication has not been input by the user (No in step S21), the control unit 21 returns to step S18.

Although the operation of FIG. 6 is an example in which the ink indication in the initial state is set to the first ink indication 310, the operation of the printing apparatus 10 is not limited to this example. For example, in step S12, the control unit 21 may display the second ink indication 320 based on the ink usage amount information 43. In this case, the control unit 21 displays the first ink indication 310 based on the ink remaining amount information 42 in step S17.

In addition, the control unit 21 may update the first ink indication 310 or the second ink indication 320 in response to an input by the user. For example, when the user inputs an update instruction, the control unit 21 receives the input. In this case, the control unit 21 updates the indication by executing step S15 during display of the first ink indication 310 and executing step S20 during display of the second ink indication 320. Accordingly, the ink indication can be updated at a timing desired by the user and the latest state related to ink of the printing apparatus 10 can be displayed.

Figure 7:
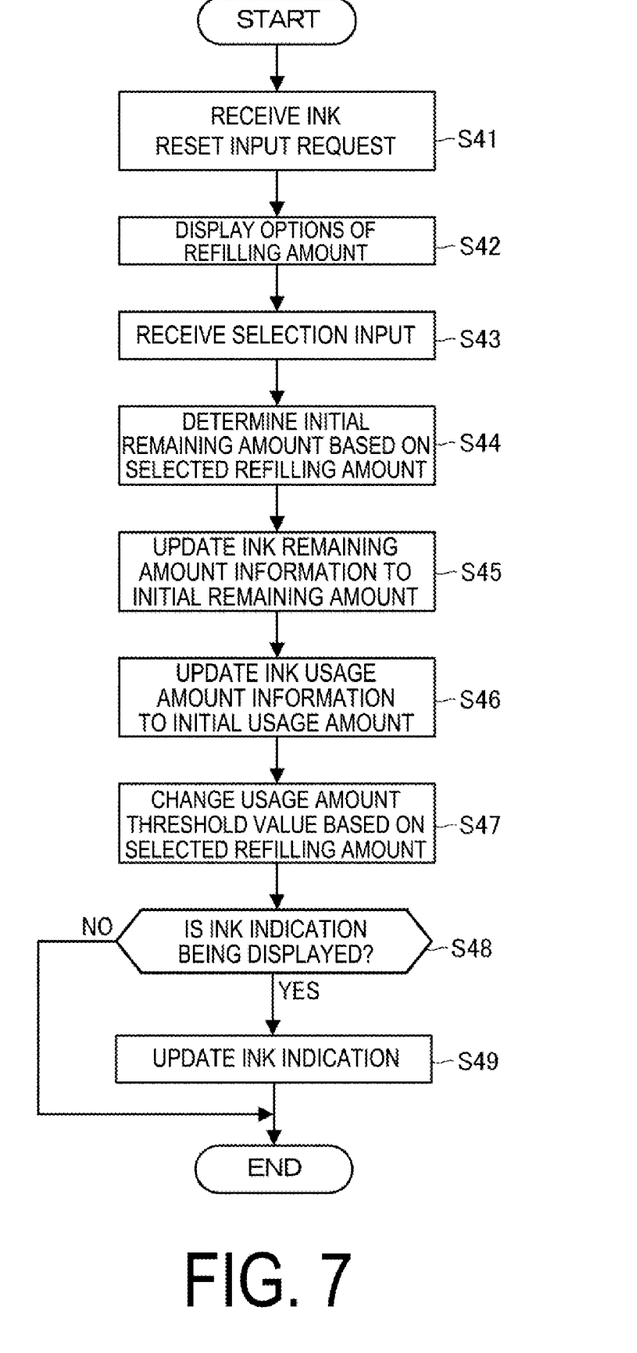
FIG. 7 is a flowchart illustrating an operation of the printing apparatus.

FIG. 7 is a flowchart illustrating an operation of the printing apparatus 10 and illustrates an operation of the control unit 21 related to ink refilling. For example, steps S41 and S43 in FIG. 7 are executed by the input receiving unit 211, and steps S42 and S44 to S47 are executed by the ink amount management unit 213. For example, steps S48 and S49 are executed by the display control unit 214.

In step S41, the control unit 21 receives an ink reset input request from the user. The ink reset input request is a request for providing an input indicating that the ink tank 50 has been refilled with ink. Subsequently, in step S42, the control unit 21 display, on the display unit 27, options of the ink refilling amount indicating the amount of ink with which the ink tank 50 has been refilled and proceeds to step S43. The options of the ink refilling amount can be, for example, four options of the full capacity, 75%, 50%, and 25% described above. For example, 75%, 50%, and 25% indicate percentages with respect to the full capacity.

In step S43, the control unit 21 receives an input for selecting any one of the options displayed in step S42. This input corresponds to the input of the refilling amount of ink with which the user has refilled the ink tank 50.

Thereafter, in step S44, the control unit 21 determines the initial remaining amount of the ink remaining amount information 42 based on the refilling amount indicated by the input received in step S43 and proceeds to step S45. In step S45, the control unit 21 updates the ink remaining amount information 42 to the initial remaining amount. In step S46, the control unit 21 updates the ink usage amount information 43 to the initial usage amount. In step S47, the control unit 21 also updates the usage amount threshold value based on the input refilling amount. The control unit 21 may execute steps S44 to S45, step S46, and step S47 in an order different from that in FIG. 7 or may execute these steps in parallel.

Thereafter, the control unit 21 proceeds to step S48 and determines whether the ink indication is being displayed on the display unit 27. When it is determined that neither the first ink indication 310 nor the second ink indication 320 is being displayed (No in step S48), the control unit 21 ends the present processing.

On the other hand, when it is determined that the first ink indication 310 or the second ink indication 320 is being displayed (YES in step S48), the control unit 21 proceeds to step S49. In step S49, the display of the first ink indication 310 or the second ink indication 320 is updated based on the updated ink remaining amount information 42 or the updated ink usage amount information 43, and the present processing ends.

Figure 8:
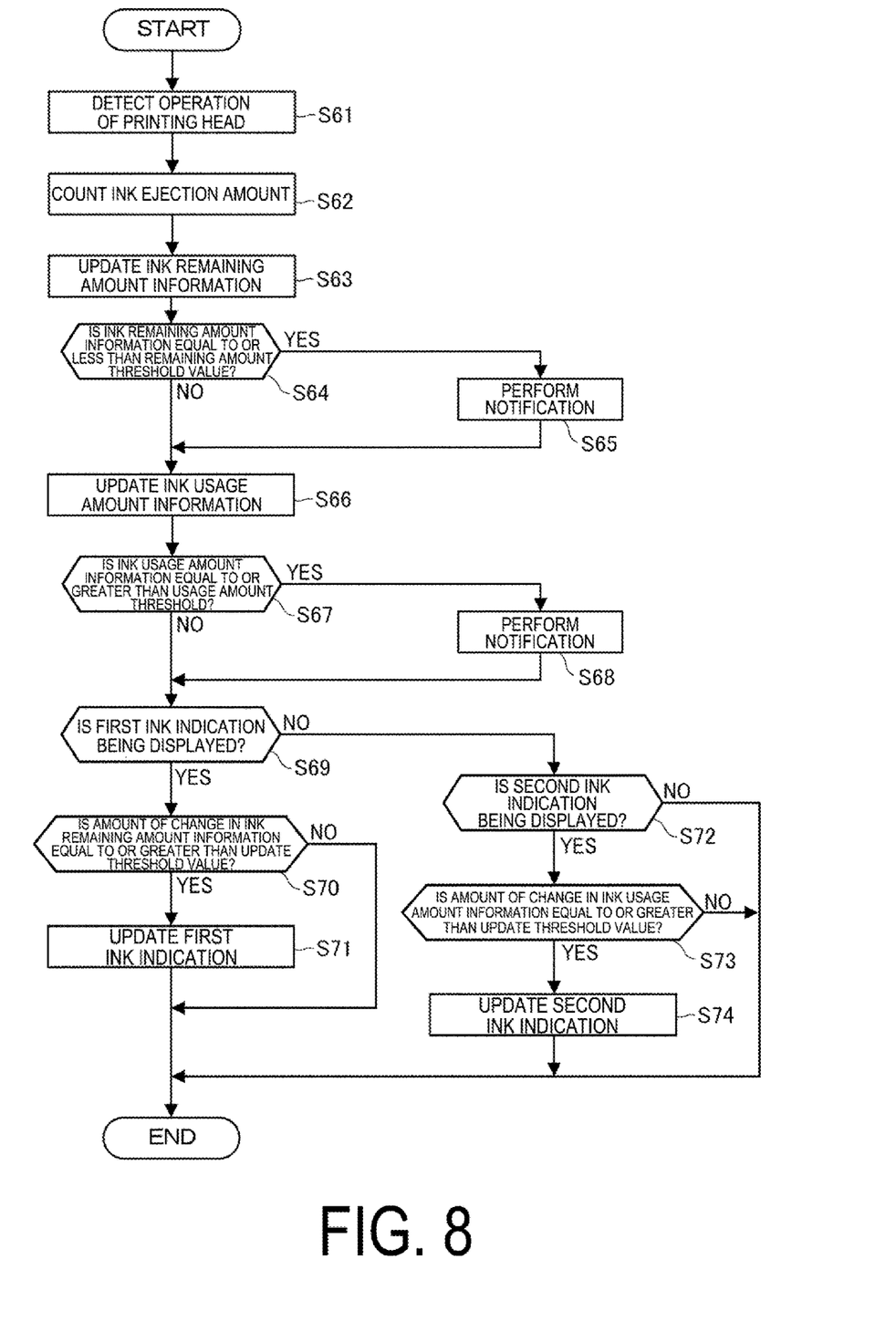
FIG. 8 is a flowchart illustrating an operation of the printing apparatus.

FIG. 8 is a flowchart illustrating an operation of the printing apparatus 10 and illustrates an operation of the control unit 21 related to ink use. For example, steps S61 to S69 and S72 in FIG. 8 are executed by the ink amount management unit 213, and steps S70, S71, S73, and S74 are executed by the display control unit 214.

In step S61, when detecting an operation of the printing head 23, the control unit 21 proceeds to step S62. In step S62, the control unit 21 counts the amount of ink ejected from the printing head 23, and in step S63, updates the ink remaining amount information 42 based on the counted amount of ink. In step S63, for example, the control unit 21 subtracts the amount of ink counted in step S62 from the ink remaining amount information 42 to update the ink remaining amount information 42. In step S64, the control unit 21 determines whether the ink remaining amount information 42 updated in step S63 is equal to or less than the remaining amount threshold value. Here, when it is determined that the ink remaining amount information 42 is equal to or less than the remaining amount threshold value (YES in step S64), the control unit 21 proceeds to step S65. In step S65, the control unit 21 performs notification and proceeds to step S66. On the other hand, when it is determined that the ink remaining amount information 42 is not equal to or less than the remaining amount threshold value (No in step S64), the control unit 21 skips step S65 and proceeds to step S66.

In step S66, the control unit 21 updates the ink usage amount information 43 based on the amount of ink counted in step S62. In step S66, for example, the control unit 21 adds the amount of ink counted in step S62 to the ink usage amount information 43 to update the ink usage amount information 43.

Thereafter, in step S67, the control unit 21 determines whether the ink usage amount information 43 updated in step S66 is equal to or greater than the usage amount threshold value. Here, when it is determined that the ink usage amount information 43 is equal to or greater than the usage amount threshold value (YES in step S67), the control unit 21 proceeds to step S68. In step S68, the control unit 21 performs notification and proceeds to step S69. In addition, when it is determined that the ink usage amount information 43 is not equal to or greater than the usage amount threshold value (No in step S67), the control unit 21 skips step S68 and proceeds to step S69.

In step S69, the control unit 21 determines whether the first ink indication 310 is being displayed. When it is determined that the first ink indication 310 is being displayed (YES in step S69), the control unit 21 proceeds to step S70. In step S70, the control unit 21 determines whether the amount of change in the ink remaining amount information 42 is equal to or greater than an update threshold value. In step S70, it is determined whether the amount of change in the ink remaining amount information 42 from previous update or display start of the first ink indication 310 is equal to or greater than the update threshold value.

When it is determined that the amount of change in the ink remaining amount information 42 is equal to or greater than the update threshold value (YES in step S70), the control unit 21 proceeds to step S71. In step S71, the control unit 21 updates the display of the remaining amount indicator 315 of the first ink indication 310 based on the ink remaining amount information 42 updated in step S63 and ends the present processing. When it is determined that the amount of change in the ink remaining amount information 42 is not equal to or greater than the update threshold value (No in step S70), the control unit 21 skips step S71 and ends the present processing.

In contrast, when it is determined that the first ink indication 310 is not being displayed (No in step S69), the control unit 21 proceeds to step S72.

In step S72, the control unit 21 determines whether the second ink indication 320 is being displayed. When it is determined that the second ink indication 320 is not being displayed (No in step S72), the control unit 21 ends the present processing.

When it is determined that the second ink indication 320 is being displayed (YES in step S72), the control unit 21 proceeds to step S73. In step S73, the control unit 21 determines whether the amount of change in the ink usage amount information 43 is equal to or greater than an update threshold value. In step S73, it is determined whether the amount of change in the ink usage amount information 43 from previous update or display start of the second ink indication 320 is equal to or greater than the update threshold value.

When it is determined that the amount of change in the ink usage amount information 43 is equal to or greater than the update threshold value (YES in step S73), the control unit 21 proceeds to step S74. In step S74, the control unit 21 updates the display of the usage amount indicator 325 of the second ink indication 320 based on the ink usage amount information 43 updated in step S66 and ends the present processing. When it is determined that the amount of change in the ink usage amount information 43 is not equal to or greater than the update threshold value (No in step S73), the control unit 21 skips step S74 and ends the processing.

The operation illustrated in FIG. 8 is repeatedly executed at predetermined time intervals while the printing apparatus 10 operates or while the printing apparatus 10 is powered on. As a result, the amount of ink ejected by the printing head 23 is counted at predetermined time intervals, and the ink remaining amount information 42 and the ink usage amount information 43 are updated.

The update threshold values used in steps S70 and S73 are, for example, included in the setting information 44 and stored in the storage unit 41. These update threshold values may not be the same values.

5. Other Embodiments

The above embodiment is merely a specific example to which the present disclosure is applied. The present disclosure is not limited to the configuration of the above embodiment and can be implemented in various aspects without departing from the gist of the disclosure.

In the above-described embodiment, an example has been described in which the operation of FIG. 6 is executed with the instruction to start the ink indication as a trigger, but the control unit 21 may execute the operation of FIG. 6 with the operation start or the power-on of the printing apparatus 10 as a trigger.

In the above-described embodiment, an example has been described in which the first ink indication 310 and the second ink indication 320 are switched and displayed on the display unit 27. This is a mere example, and in addition to or instead of the display control unit 214 displaying the first ink indication 310 or the second ink indication 320 on the display unit 27, the ink indication may be displayed by the host device 100. In this case, the control unit 21 may transmit, to the host device 100, data for displaying the first ink indication 310 and/or the second ink indication 320 and a command for instructing display, and the host device 100 may perform display based on the data and the command. The functions of the input receiving unit 211, the ink amount management unit 213, and the display control unit 214 included in the control unit 21 may be executed by the host device 100.

6. Configuration Described by Embodiment

The following configurations will be described based on the above embodiment.

Configuration 1

A printing apparatus including an ink storage unit configured to be refilled with ink, a printing head configured to eject the ink supplied from the ink storage unit to a printing medium, a display unit, and a control unit configured to manage ink remaining amount information indicating an amount of the ink stored in the ink storage unit and ink usage amount information indicating a cumulative value of an amount of the ink ejected from the printing head, wherein the control unit executes at least one of processing of updating the ink remaining amount information to an initial remaining amount or processing of updating the ink usage amount information to an initial usage amount when an input indicating that the ink storage unit is refilled with the ink is received, displays, on the display unit, a first ink indication indicating a usage state of the ink based on the ink remaining amount information and a second ink indication indicating the usage state of the ink based on the ink usage amount information, and switches an indication on the display unit from the first ink indication to the second ink indication or from the second ink indication to the first ink indication when an input instructing switching of the indication on the display unit is received.

According to the printing apparatus of configuration 1, the printing apparatus configured to be refilled with ink switches the indication related to the amount of ink between the indication based on the remaining amount of ink and the indication based on the usage amount of ink, and thus it is possible to perform display that is easy for the user to utilize.

Configuration 2

The printing apparatus according to configuration 1, including a storage unit configured to store the ink remaining amount information and the ink usage amount information, wherein the control unit acquires ink consumption information indicating the amount of the ink ejected from the printing head and updates, based on the ink consumption information, the ink remaining amount information and the ink usage amount information stored in the storage unit.

According to the printing apparatus of configuration 2, the ink remaining amount information and the ink usage amount information are updated based on the amount of the ink ejected from the printing head, and thus it is possible to more accurately display the information related to the ink of the printing apparatus.

Configuration 3

The printing apparatus according to configuration 2, wherein the ink remaining amount information indicates an amount obtained by cumulatively subtracting the amount of the ink ejected by the printing head from the initial remaining amount, and the ink consumption information indicates an amount obtained by cumulatively adding the amount of the ink ejected by the printing head to the initial usage amount.

According to the printing apparatus of configuration 3, it is possible to easily calculate and update the ink remaining amount information and the ink usage amount information based on the amount of the ink ejected from the printing head.

Configuration 4

The printing apparatus according to any one of configurations 1 to 3, wherein the control unit performs notification when the amount of the ink indicated by the ink remaining amount information reaches a remaining amount threshold value or when the amount of the ink indicated by the ink usage amount information reaches a usage amount threshold value.

According to the printing apparatus of configuration 4, it is possible to provide the user with information regarding the amount of the ink by performing the notification in addition to the indication related to the amount of the ink.

Configuration 5

The printing apparatus according to any one of configurations 1 to 4, wherein when an input designating an amount of the ink with which the ink storage unit is refilled is received as the input indicating that the ink storage unit is refilled with the ink, the control unit determines the initial remaining amount based on the amount of the ink refilled and updates the ink remaining amount information based on the initial remaining amount.

According to the printing apparatus of configuration 5, when the user designates the amount of the ink refilled, the ink remaining amount information can be updated based on the designated amount. For this reason, the amount of the ink refilled by the user is not limited to, for example, the full capacity, and thus it is possible to improve convenience for the user.

Configuration 6

The printing apparatus according to any one of configurations 1 to 5, wherein the control unit updates the first ink indication when the amount of the ink indicated by the ink remaining amount information changes by a threshold value or more or when a set update time elapses while the first ink indication is displayed.

According to the printing apparatus of configuration 6, it is possible to appropriately provide the user with accurate information by updating the indication based on the remaining amount of the ink at an appropriate timing.

Configuration 7

The printing apparatus according to any one of configurations 1 to 6, wherein the control unit updates the second ink indication when the amount of the ink indicated by the ink usage amount information changes by a threshold value or more or when a set update time elapses while the second ink indication is displayed based on the ink usage amount information.

According to the printing apparatus of configuration 7, it is possible to appropriately provide the user with accurate information by updating the indication based on the usage amount of the ink at an appropriate timing.

Configuration 8

The printing apparatus according to any one of configurations 1 to 7, wherein the control unit updates the first ink indication or the second ink indication when an input instructing update of the indication by the display unit is received.

According to the printing apparatus of configuration 8, it is possible to improve convenience for the user by updating the indication based on the usage amount of the ink at a timing desired by the user.

What is claimed is:

1. A printing apparatus comprising:
   an ink storage unit configured to be refilled with ink;
   a printing head configured to eject the ink supplied from the ink storage unit to a printing medium;
   a display unit; and
   a control unit configured to manage ink remaining amount information indicating an amount of the ink stored in the ink storage unit and ink usage amount information indicating a cumulative value of an amount of the ink ejected from the printing head, wherein
   the control unit
   executes at least one of processing of updating the ink remaining amount information to an initial remaining amount or processing of updating the ink usage amount information to an initial usage amount when an input indicating that the ink storage unit is refilled with the ink is received,
   displays, on the display unit, a first ink indication indicating a usage state of the ink based on the ink remaining amount information and a second ink indication indicating the usage state of the ink based on the ink usage amount information, and
   switches an indication on the display unit from the first ink indication to the second ink indication or from the second ink indication to the first ink indication when an input instructing switching of the indication on the display unit is received.

2. The printing apparatus according to claim 1, comprising
   a storage unit configured to store the ink remaining amount information and the ink usage amount information, wherein
   the control unit acquires ink consumption information indicating the amount of the ink ejected from the printing head and updates, based on the ink consumption information, the ink remaining amount information and the ink usage amount information stored in the storage unit.

3. The printing apparatus according to claim 2, wherein the ink remaining amount information indicates an amount obtained by cumulatively subtracting the amount of the ink ejected by the printing head from the initial remaining amount, and the ink consumption information indicates an amount obtained by cumulatively adding the amount of the ink ejected by the printing head to the initial usage amount.

4. The printing apparatus according to claim 1, wherein the control unit performs notification when the amount of the ink indicated by the ink remaining amount information reaches a remaining amount threshold value or when the amount of the ink indicated by the ink usage amount information reaches a usage amount threshold value.

5. The printing apparatus according to claim 1, wherein when an input designating an amount of the ink with which the ink storage unit is refilled is received as the input indicating that the ink storage unit is refilled with the ink, the control unit determines the initial remaining amount based on the amount of the ink refilled and updates the ink remaining amount information based on the initial remaining amount.

6. The printing apparatus according to claim 1, wherein the control unit updates the first ink indication when the amount of the ink indicated by the ink remaining amount information changes by a threshold value or more or when a set update time elapses while the first ink indication is displayed.

7. The printing apparatus according to claim 1, wherein the control unit updates the second ink indication when the amount of the ink indicated by the ink usage amount information changes by a threshold value or more or when a set update time elapses while the second ink indication is displayed based on the ink usage amount information.

8. The printing apparatus according to claim 1, wherein the control unit updates the first ink indication or the second ink indication when an input instructing update of the indication by the display unit is received.

* * * * *